United States Patent [19]

Fuller

[11] Patent Number: 4,485,699
[45] Date of Patent: Dec. 4, 1984

[54] ROTATABLE HAND TOOL WITH DIRECTIONAL DRIVE CONTROL

[76] Inventor: Kevin S. Fuller, 3418 N. Greenbrier, Vadnais Heights, Minn. 55110

[21] Appl. No.: 407,554

[22] Filed: Aug. 12, 1982

[51] Int. Cl.³ .................. B25B 15/04; F16D 15/00; F16D 41/04
[52] U.S. Cl. .................. 81/59.1; 192/44; 192/48.92; 145/76; 81/63.1; 81/58.3
[58] Field of Search .............. 81/59.1, 58.3, 63.1, 81/58.1; 192/44, 45, 48.92; 145/70–71, 75–77, 53–54

[56] References Cited

U.S. PATENT DOCUMENTS

| 819,536 | 5/1906 | Furbish | |
|---|---|---|---|
| 3,194,368 | 7/1965 | Benson et al. | 192/45 |
| 3,332,304 | 7/1967 | Lynn | 81/58.3 X |
| 3,742,787 | 7/1973 | Whiteford | 145/75 |
| 3,844,322 | 10/1974 | Stoutenberg | 81/58.3 X |
| 3,868,983 | 3/1975 | Newcomb | 81/59.1 |
| 4,341,292 | 7/1982 | Acevedo | 81/58.3 X |

Primary Examiner—Frederick R. Schmidt
Assistant Examiner—Debra S. Meislin
Attorney, Agent, or Firm—Peterson, Palmatier, Sturm, Sjoquist & Baker, Ltd.

[57] ABSTRACT

The hand tool includes a drive shaft formed with axially spaced cylindrical portions has a work engaging member thereon. A bearing assembly comprised of two oppositely acting clutch units slideable within a tubular handle to engage one or the other of the cylindrical portions on the drive shaft to determine the direction in which the drive shaft rotates. When the clutch units are engaged with both cylindrical portions, then the tubular handle is coupled directly to the drive shaft so that the shaft is rotated in whichever direction the handle is twisted.

9 Claims, 5 Drawing Figures

U.S. Patent     Dec. 4, 1984     4,485,699
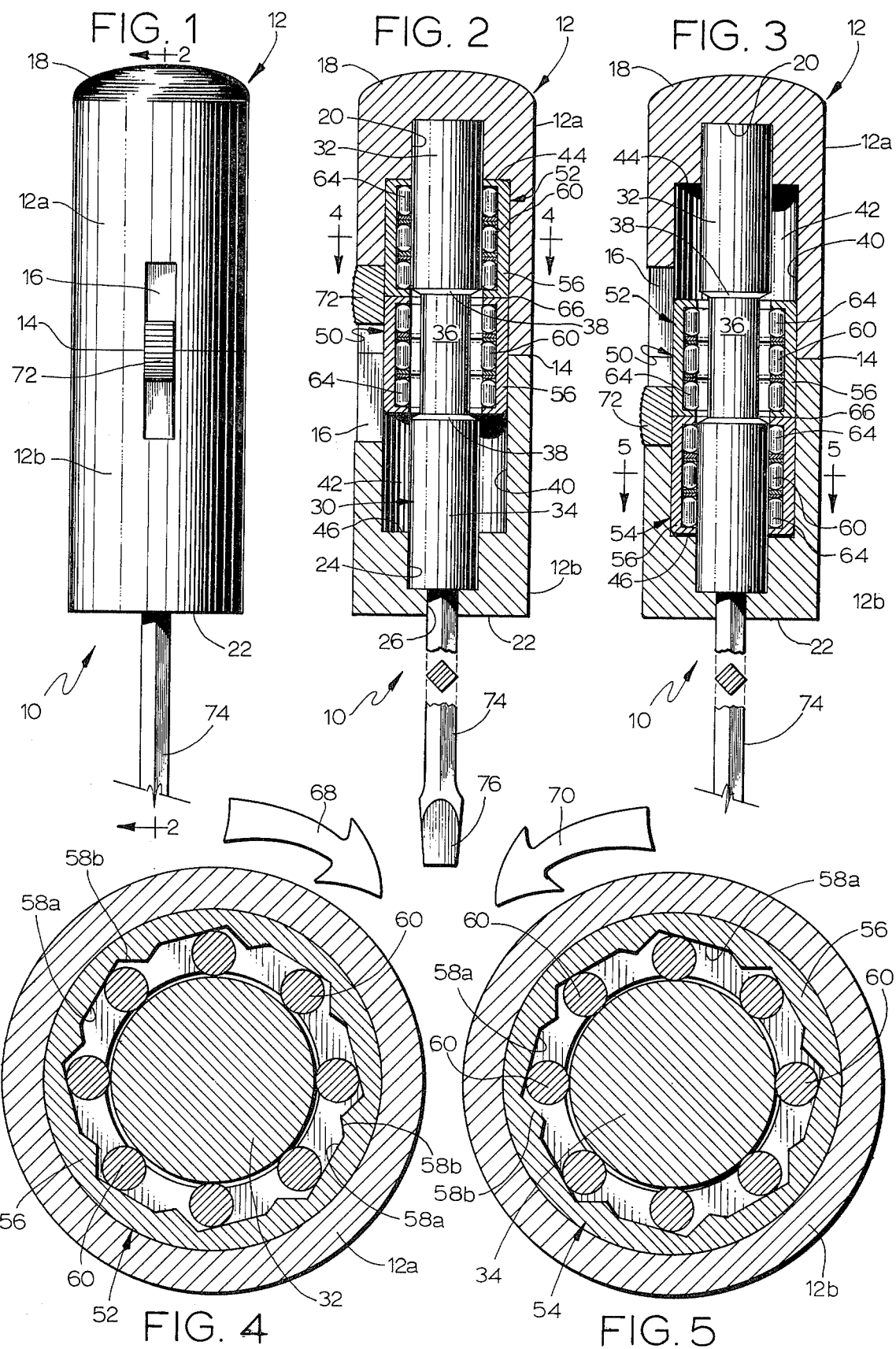

ROTATABLE HAND TOOL WITH DIRECTIONAL DRIVE CONTROL

BACKGROUND OF THE INVENTION

1. Field of the Invention

This invention relates generally to reversible drive hand tools for tightening or loosening screws, nuts, bolts and the like.

2. Description of the Prior Art

A number of hand tools have been devised in which the rotation of a handle in a clockwise direction effects a tightening of a screw, nut or bolt, whereas a reverse rotation in a counterclockwise direction will be ineffectual. Conversely, via an adjusting mechanism, the handle of the tool in such instances can be rotated in an opposite or counterclockwise direction to accomplish a loosening of the screw, nut or bolt, the rotation of the handle in a clockwise direction then being ineffectual.

For the most part, such prior art devices have involved the use of a ratchet mechanism which when appropriately adjusted enables the user to effect a tightening action when the handle is rotated clockwise without any loosening when rotated in a counterclockwise direction, and conversely to achieve a loosening action when the handle is rotated in a counterclockwise direction without any loosening action being realized when the handle under these conditions is rotated in a clockwise direction. An example of such a tool is disclosed in U.S. Pat. No. 819,536, issued on May 1, 1906, to Zachary T. Furbish for "Shifter Lock for Pawl and Ratchet Tools". The difficulty with this type of tool is that the torque must be transmitted through a relatively fragile ratchet mechanism. Still further, owing to the nature of a ratchet mechanism, the handle must be oscillated in opposite directions through a significant angle before the ratchet mechanism becomes effective to transmit torque from the handle to the shank carrying the work engaging member thereon, such as a screwdriver or a socket wrench. An angular "play" of the magnitude previously experienced can be extremely annoying. Coupled with the inability of a ratchet mechanism of limited size to transmit large amounts of torque, the tool just alluded to has not, as far as known to me, met with any great degree of success.

A widely used commercially available reversible hand tool is disclosed in U.S. Pat. No. 3,742,787, granted on July 3, 1973, to Carlton L. Whiteford for "Reversible Drive Ratchet Hand Tool with Spherical Handle". In this instance, the spherical handle is sufficiently large so as to accommodate therein a relatively rugged ratchet mechanism. To effect a reverse operation, however, it is necessary to remove the shank having the work engaging member thereon, such as a screwdriver, from a radially directed socket in the spherical handle and then reinsert the shank in a socket diametrically opposite the first socket. Owing to the relatively large diameter of the handle, a considerable amount of torque can be manually produced, but the size of the handle limits its use in confined spaces. Furthermore, having to reposition the tool shank can be somewhat bothersome.

Another type of reversible handle tool is exemplified in U.S. Pat. No. 3,332,304, issued on July 25, 1967, to Ben H. Lynn for "Reversible Socket Wrench Handle". This patent makes use of two coil springs which frictionally grip a shaft to which the tool member is attached. Here again, a problem arises with respect to the transmission of relatively large twisting forces or torque, and there can also be a certain amount of unnecessary angular movement before the convolutions of either coil spring contracts sufficiently to transmit the necessary twisting force.

SUMMARY OF THE INVENTION

Accordingly, an important object of my invention is to provide a compact rotatable hand tool having directional drive control capabilities which will enable the tool to be utilized in confined quarters.

Another object is to provide a rotatable hand tool that is not only compact but which is rugged and simply constructed so that it will be capable of transmitting relatively large twisting forces or torque.

Still another object is to provide a rotatable hand tool of the foregoing character that can be readily adjusted so as to effect an incremental tightening or loosening, as the case may be, without having to reposition the shank on which the tool member itself is mounted. More specifically, an aim of the invention is to provide a slideable member in the form of a button that is manually shifted in one axial direction to achieve a tightening action and in an opposite direction to achieve a loosening action.

It is also an object of my invention to provide a rotatable hand tool that not only possesses a directional drive control enabling either a selected tightening or loosening action to be realized, but which can be adjusted so that the tool will either tighten or loosen a member, such as a screw, nut or bolt, when the handle is rotated in either direction. Stated somewhat differently, it is within the purview of my invention to provide a hand tool that can be adjusted so that there is a direct drive in either direction, the handle under these circumstances being coupled directly to the shank carrying the tool member thereon.

Yet another object of the invention is to provide a rotatable hand tool possessing directional drive control capabilities that can be manufactured of various materials. More specifically, it is envisaged that the handle itself be of plastic so that dielectric properties are imparted to the tool, such properties being especially desirable when the tool is to be used in conjunction with electrical wiring and various types of electrical apparatus.

Briefly, my invention involves the use of a drive shaft formed with two axially spaced cylindrical portions or lands thereon with a reduced diameter section therebetween. A bearing assembly composed of two one-way clutch units encircle the drive shaft, one of the clutch units serving to rotate the shaft in a clockwise direction when in registry with one of the cylindrical shaft portions and the other clutch unit causing the shaft to be reversely rotated when in registry with the other cylindrical portion. The bearing unit is shiftable within a tubular handle between two extreme axial positions by means of a slidetype button mounted on the bearing assembly, manually shifting the button into one extreme position permitting the shaft to be rotated in a clockwise direction and shifting the button into the other extreme position permitting the shaft to be rotated in a counterclockwise direction. When the button is midway between its two extreme positions, then both clutch units become effective so that the drive shaft is rotated in either direction, there then being a direct coupling between the two clutch units and the two cylindrical portions. The shaft has a shank projecting therefrom on which an appropriate work engaging member, such as a screwdriver or socket wrench, is attached.

BRIEF DESCRIPTION OF THE DRAWINGS

FIG. 1 is a perspective view illustrating my rotatable hand tool adjusted so as to function as a conventional screwdriver in that torque is transmitted when the handle is twisted in either direction;

FIG. 2 is a longitudinal sectional view taken in the direction of line 2—2 of FIG. 1, but with the tool adjusted so as to incrementally tighten a screw when the handle is rotated in a clockwise direction;

FIG. 3 is a sectional view similar to FIG. 2 but with the tool adjusted so as to effect an incremental loosening of a screw;

FIG. 4 is a sectional detail view taken in the direction of line 4—4 of FIG. 2, and FIG. 5 is a sectional detail view taken in the direction of line 5—5 of FIG. 3.

DESCRIPTION OF THE PREFERRED EMBODIMENT

Referring now in detail to the drawings, it will be observed that the rotatable hand tool exemplifying my invention has been denoted generally by the reference numeral 10. The tool 10 includes a metal tubular casing 12 forming a handle; to impart dielectric properties to the tool, the tubular casing 12 can be fabricated from a suitable plastic rather than metal. Actually, the casing 12 can be composed of two individual cup-shaped components 12a, 12b that are secured together by welding at 14. This two-part technique for producing the tubular casing 12 lends itself readily to providing a needed slot labeled 16.

Still further, the casing component 12a, in the illustrated situation has an integral end wall 18 formed with a cylindrical recess at 20. The other casing component 12b has an end wall 22 formed with a cylindrical recess 24 plus a cylindrical central opening 26.

As can be discerned from FIGS. 2 and 3, the tool 10 further comprises a drive shaft 30, preferrably of metal. The drive shaft 30 is formed with cylindrical end portions 32, 34, the cylindrical portions 32 and 34 being spaced axially from each other so as to form a necked down intermediate portion 36 having a lesser diameter than the portions 32, 34. Chamfered surfaces 38 incline outwardly from the necked in portion 36 to the cylindrical portions 32, 34. It should be pointed out at this stage that the diameter of the cylindrical portions 32, 34 corresponds to the inner diameter of the recesses 20, 24, the upper end of the cylindrical portion 32 being journaled for rotation in the recess 20 and the lower end of the cylindrical portion 34 being journaled in the recess 24. The inner surface or bore 40 of the tubular casing 12 forms an annular space 42 with the drive shaft 30, the space 42 extending between the inner surfaces or shoulders 44 and 46 of the end walls 18 and 22, respectively.

Playing an important role in the practicing of my invention is a bearing assembly indicated generally by the reference numeral 50. In the illustrated instance, the bearing assembly 50 is comprised of two clutch units 52 and 54. Each clutch unit 52, 54 has an outer race 56, preferably of metal in order to minimize wear. Actually, there is no inner race, as such, the cylindrical portion 32 functioning as an inner race for the unit 52 and the cylindrical portion 34 functioning as an inner race for the unit 54. It is to be observed, especially from FIGS. 3 and 5, that each race 56 is formed with angled cam surfaces 58a and 58b. Close inspection of FIGS. 3 and 5 will indicate that the cam surfaces 58a have a more gradual taper imparted thereto than the cam surfaces 58b. Comparing FIGS. 3 and 5 will demonstrate that the cam surfaces 58a are tapered in opposite directions with respect to these two views. As the description progresses, it will become apparent that the slight taper given to the surfaces 58a determine the direction in which the clutching action occurs.

Describing the bearing assembly 50 in further detail, mainly, the clutch units 52 and 54, it will be perceived that there are rollers 60 in each unit 52, 54 held captive by means of a retainer cage. The rollers 60 are dimensioned, especially as far as their diameter is concerned, so that when located at the apex of the cam surfaces 58a, 58b, there is no clutching action because of the increased space accommodating the rollers 60 in such a position. However, when the outer race 56 is rotated in a clockwise direction as viewed in FIG. 3, then the rollers 60 are urged against the sloping cam surfaces 58a so as to cause the rollers 60 to bear tightly against the particular cylindrical portion 32 or 34 of the drive shaft 30.

From FIG. 4, it is readily apparent that the rollers 60 of the clutch unit 52 are forced into engagement with the cylindrical portion 32, because in this view the clutch unit 52 is in registry or radial alignment with the cylindrical portion 32. Similarly, the clutch unit 54 is registered or radially aligned in FIG. 5 with the cylindrical 34, so in that instance, the rollers 60 are wedged tightly against the cylindrical portion 34 when the race 56 of the clutch unit 54 is rotated in a counterclockwise direction.

In actual practice, it is intended that the rollers 60 of each clutch unit 52 and 54 be flanked by additional rollers 64 that perform solely a bearing function. Inasmuch as such a clutch unit is fully described in U.S. Pat. No. 3,194,368, granted on July 13, 1965, to Carl F. Benson et al for "Unitary Assembly of Overrunning Clutch and Bearing", reference may be had to that patent for a more complete description of the structure found most suitable for use in my rotatable hand tool 10.

It has facilitated the foregoing description to refer to two clutch units, these clutch unis having been designated by the reference numerals 52 and 54. Thus, referring once again to the Benson et al patent, two such units would simply be reversed with respect to each other in order to provide the oppositely directed one-way clutching action that has been referred to. In such an instance, it is only necessary to butt weld the respective races 56 to each other at 66 so as to form the bearing assembly 50. It will be recognized, though, that the bearing assembly 50 can be comprised of two integral clutching units providing the same function as the individual reversely oriented clutching units 52 and 54, the assembly in such a modified situation having a single outer race that would extend longitudinally or axially a sufficient distance so as to embrace the two integrally disposed clutch units.

Irrespective of the specific construction of the bearing assembly 50, it will be recognized, especially as the description progresses, that the assembly 50 should perform a clutching action when the race 56 is rotated in one direction, as indicated by the arrow 68 in FIG. 4, and when the particular one-way clutch unit 52 is in registry with the cylindrical portion 32 of the drive shaft 30, and an oppositely directed clutching action, as denoted by the arrow 70 in FIG. 5, when the particular clutch unit 54 is in registry with the cylindrical portion 34. Here again, this will presently become manifest.

Having mentioned the slot 16, attention is now directed to the presence of a slide button 72 that projects radially outward through the slot 16. Depending upon the specific construction of the bearing assembly 50, the button 72 can be formed integrally with the race 56 of each clutch unit 52 and 54. In the depicted instance, however, the button 72 is simply secured to the outer races 56 of both clutch units 52, 54 by means of a suitable adhesive; obviously, welding can be employed. What should be appreciated, though, is that when the button 72 is manually shifted within the slot 16, it moves both of the clutch units 52, 54 as a unit, the clutch units 52, 54 comprising the bearing assembly 50.

Consequently, when the assembly 50 is moved by shifting the button 72 into an upward extreme position as viewed in FIG. 2, it can be appreciated that the clutch unit 52 is then brought in registry or radial alignment with the cylindrical portion 32 of the drive shaft 30. Hence, when the casing 12, which has been referred to as constituting the handle of the tool 10, is rotated in a clockwise direction as viewed from the top in FIG. 2, and in the direction of the arrow 68 in FIG. 4, the rollers 60 of the unit 52 are wedged against the cylindrical portion 32 by reason of the tapered cam surfaces 58a.

On the other hand, when the button 72 is manually positioned at the other end of the slot 16, then the clutch unit 54 is moved into circumferential adjacency with the cylindrical portion 34 of the drive shaft 30. Inasmuch as the clutch unit 54 performs its clutching action in an opposite rotative direction from the clutch unit 52, it follows that when the tubular casing or handle 12 is rotated in a counterclockwise direction as viewed from the top in FIG. 3, and in the direction of the arrow 70 in FIG. 5, then the rollers 60 of the clutch unit 54 are forced against the cylindrical portion 34 by means of the sloping cam surfaces 58a of this unit.

In either of the above instances, the surface 58b are ineffectual to cause a gripping of either of the cylindrical portions 32 or 34 so that when the clutch unit 52 is in juxtaposition with the cylindrical portion 32, only a clutching or gripping action is effected when the tubular casing or handle 12 is rotated in a clockwise direction, rotation of the tubular casing 12 in a counterclockwise direction resulting in no clutching action. It will be appreciated that just the opposite occurs as far as the clutch unit 54 and its action relative to the cylindrical portion 34. On the other hand, when both clutch units 52, 54 are engaged with sections of the cylindrical portions 32, 34, as is the case when the button is midway between the ends of the slot 16 (see FIG. 1), then there is a direct drive or coupling from the tubular handle 12 in either rotative direction, for both clutch units 52, 54 are then effective. To achieve this, the axial length of the assembly 50, that is, the combined length of the clutch units 52 and 54, is made greater than the axial length of the intermediate portion 36. In other words, the tool 10, under these circumstances, functions as a conventional screwdriver (or socket wrench), as will be made apparent below.

Depending upon the amount of torque that the drive shaft 30 is to transmit, a shank 74 is either press fitted or keyed into the cylindrical portion 34 of the drive shaft 30. What is necessary is that the shank 74 rotate in unison with the drive shaft 30. Therefore, the shank 74 illustratively has a square cross section, the shank 74 extending upwardly through the opening 26 into the cylindrical portion 34 of the drive shaft 30, the portion 34 having a complementally configured bore or recess. Although it is contemplated that various work engaging members be carried by, or integral with, the shank 74, in the present instance a screwdriver bit 76 has been shown, appearing only in FIG. 2 because of space restrictions.

I claim:

1. A rotatable hand tool with directional drive control comprising a handle having a longitudinal bore therein, first and second oppositely acting one-way clutch units contained in said handle bore, a drive shaft extending completely through said bore and having its ends received in portions of said handle adjacent the ends of said bore, said drive shaft providing cylindrical surface means and having a portion of lesser cross-section than said first and second cylindrical portions, said clutch units being shiftable in an axial direction within said bore to effect alignment and a clutching action of said first clutch unit with said cylindrical surface means and non-alignment and disengagement of said second clutch unit or alignment and a clutching action of said second clutch unit with said cylindrical surface means and non-alignment and disengagement of said first clutch unit to cause said handle to rotate said shaft in one rotative direction when said first clutch unit is in alignment with said cylindrical surface means and to cause said handle to rotate said second clutch unit in an opposite rotative direction when said second clutch unit is in alignment with said cylindrical surface means at least of said clutch units when disengaged being in alignment with the portion of lesser cross-section, said handle having a longitudinal slot extending inwardly from the outer surface of said handle into said bore, manually actuatable shifting means slideable in said longitudinal slot and extending outwardly therethrough from said bore for shifting said first and second clutch units in said axial direction within said bore to effect alignment of said first clutch unit with said cylindrical surface means when said shifting means is moved toward one end of said slot and to effect alignment of said second clutch unit with said cylindrical surface means when said shifting means is moved toward the other end of said slot, and a tool member coupled to said drive shaft, whereby said tool member is rotated in said one direction or said opposite direction depending upon whether said first clutch unit is in alignment with said cylindrical surface means or said second clutch unit is in alignment with said cylindrical surface means.

2. A hand tool in accordance with claim 1 in which said first and second clutch units are axially adjacent each other and said cylindrical surface means includes axially spaced first and second cylindrical portions with said lesser cross-section portion being located intermediate intermediate portion therebetween of lesser cross section than rotates said drive shaft in said one direction when said first clutch unit is in alignment with said first cylindrical portion and rotates said drive shaft in said opposite direction when said second clutch unit is in alignment with said second cylindrical portion.

3. A hand tool in accordance with claim 2 in which said first and second clutch units have substantially the same axial length and said intermediate portion has an axial length substantially equal to that of either clutch unit.

4. A hand tool in accordance with claim 3 in which said first and second clutch units each constitutes a roller bearing assembly.

5. A hand tool in accordance with claim 4 in which said clutch units are joined together to move in unison, and said shifting means includes a button projecting radially through said slot and attached to at least one of said clutch units so that said first and second clutch units can be axially and simultaneously shifted within said bore to effect a clutching action depending upon the alignment of said first clutch unit with said first cylindrical portion or alignment of said second clutch unit with said second cylindrical portion.

6. A hand tool in accordance with claim 5 including a shank fixedly mounted on said second cylindrical portion and projecting from one end of said handle so that a tool member can be attached thereto.

7. A rotatable hand tool with directional drive control comprising tubular handle means having spaced end portions, a bearing assembly axially slideable within said tubular handle means including first and second oppositely acting one-way clutch units, a drive shaft having first and second axially spaced cylindrical portions, one end of said first cylindrical portion being rotatably disposed within one end portion of said tubular handle means and one end of said second cylindrical portion being rotatably disposed in the other of said end portions, said drive shaft having an intermediate portion of lesser diameter than said cylindrical portions, said clutch units each including a race having a number of inwardly facing angled cam surfaces and a number of rollers acted on by said angled cam surfaces, the inclination of said angled cam surfaces of said first clutch unit being opposite to the inclination of the angled cam surfaces of said second clutch unit, whereby the radial alignment of said first clutch unit with said first cylindrical portion and the radial alignment of said second clutch unit with said portion of lesser diameter causes the rollers of said first clutch unit to be forced against said first cylindrical portion and said drive shaft to be rotated in one rotative direction when said tubular handle means is rotated in that direction and whereby the radial alignment of said second clutch unit with said second cylindrical portion and the radial alignment of said first clutch unit with said portion of lesser diameter causes the rollers of said second unit to be forced against said second cylindrical portion and said drive shaft to be rotated in an opposite rotative direction when said tubular handle means is rotated in an opposite rotative direction, and work engaging means attached to said drive shaft so that said work engaging means is rotated in either a clockwise or counterclockwise direction depending upon the alignment of said first clutch unit with said first cylindrical portion or the alignment of said second clutch unit with said second cylindrical portion.

8. A hand tool in accordance with claim 7 in which the combined length of said first and second clutch units is greater than the axial length of said intermediate portion so that sections of said first and second clutch units can be shifted into radial alignment with sections of said first and second cylindrical portions, whereby said drive shaft is rotated in whichever rotative direction said tubular handle means is rotated.

9. A hand tool in accordance with claim 8 in which there is an annular space between said tubular handle means and said first and second cylindrical portions, said annular space having an axial length sufficient so that said first and second clutch units can be shifted within said tubular handle means to effect radial alignment of said first clutch units with said first cylindrical portion or said second clutch units with said second cylindrical portion.

* * * * *

UNITED STATES PATENT AND TRADEMARK OFFICE
CERTIFICATE OF CORRECTION

PATENT NO. : 4,485,699
DATED : December 4, 1984
INVENTOR(S) : Kevin S. Fuller

It is certified that error appears in the above-identified patent and that said Letters Patent are hereby corrected as shown below:

In column 4, line 44, "unis" should be -- units --.
In claim 1, column 6, line 31, after "least" insert -- one --.
In claim 2, column 6, line 55, delete second occurrence of "intermediate" and also "portion therebetween of lesser cross section than" and insert -- said first and second cylindrical portions so that said handle --.
In claim 9, column 8, line 33, "units" should be -- unit --; in column 8, line 34, "units" should be -- unit --.

Signed and Sealed this

Eleventh Day of June 1985

[SEAL]

Attest:

DONALD J. QUIGG

Attesting Officer

Acting Commissioner of Patents and Trademarks